(12) United States Patent
Dotson

(10) Patent No.: US 6,759,891 B2
(45) Date of Patent: Jul. 6, 2004

(54) THERMAL SHUTDOWN CIRCUIT WITH HYSTERESIS AND METHOD OF USING

(75) Inventor: Robert N. Dotson, Chandler, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 10/133,761

(22) Filed: Apr. 29, 2002

(65) Prior Publication Data

US 2003/0201816 A1 Oct. 30, 2003

(51) Int. Cl.$^7$ ................................................ G05F 3/26
(52) U.S. Cl. ...................... 327/512; 327/361; 327/540; 361/103; 323/315
(58) Field of Search ................................ 327/512, 513, 327/539, 542, 361; 323/313–317, 907; 361/103, 87, 93; 374/100

(56) References Cited

U.S. PATENT DOCUMENTS

| | | | |
|---|---|---|---|
| 4,667,265 A | * 5/1987 | Stanojevic et al. | ......... 361/103 |
| 4,972,136 A | 11/1990 | Banura | ...................... 323/275 |
| 5,099,381 A | 3/1992 | Wilcox | ....................... 361/103 |
| 5,313,381 A | 5/1994 | Balakrishnan | ............... 363/147 |
| 5,355,123 A | 10/1994 | Nishiura et al. | ............. 340/653 |
| 5,519,354 A | * 5/1996 | Audy | .......................... 327/512 |
| 5,737,170 A | 4/1998 | Moyer | ......................... 361/103 |
| 5,980,106 A | 11/1999 | Yamamoto et al. | .......... 374/178 |
| 6,002,244 A | * 12/1999 | Wrathall | ...................... 323/315 |
| 6,002,293 A | * 12/1999 | Brokaw | ....................... 327/540 |
| 6,078,511 A | 6/2000 | Fasullo et al. | ................ 363/50 |
| 6,222,355 B1 | 4/2001 | Ohshima et al. | ............. 323/282 |

* cited by examiner

Primary Examiner—Minh Nguyen
(74) Attorney, Agent, or Firm—James J. Stipanuk

(57) ABSTRACT

An integrated circuit (10) includes a thermal shutdown circuit that incorporates hysteresis for shutting down a functional circuit (13) when its temperature exceeds a predefined value. First and second current sources (18, 17) respectively produce first and second reference currents ($I_{REF1}$, $I_{REF2}$) representative of first and second die temperatures of the integrated circuit. A current mirror (14) has an input (19) for summing the first and second reference currents and an output (15) for providing a mirror current ($I_{MIRROR}$). A detection circuit (12) has an output coupled to the output of the current mirror for sinking the mirror current to produce a detection signal ($V_{DET}$) as a function of the first and second die temperatures.

18 Claims, 3 Drawing Sheets

THERMAL SHUTDOWN CIRCUIT WITH HYSTERESIS AND METHOD OF USING

BACKGROUND OF THE INVENTION

The present invention relates in general to semiconductor devices and, more particularly, to high power integrated circuits.

Semiconductor manufacturers often fabricate integrated circuits with protection circuitry in order to increase reliability. For example, an integrated voltage regulator that operates with a high power dissipation and elevated die temperature often includes a thermal shutdown circuit that senses the integrated circuit's die temperature and turns off the voltage regulator when the die temperature rises to a predefined threshold temperature. When the die cools down, the thermal shutdown circuit turns the voltage regulator back on.

Some thermal shutdown circuits suffer from thermally induced noise caused when they cycle the voltage regulator on and off in rapid succession as the die temperature fluctuates in a small range around a threshold temperature. This cycling produces noise or thermal oscillations which can damage the regulator or external components supplied by the regulator. Many thermal shutdown circuits avoid this problem by incorporating hysteresis that turns off the regulator when the temperature reaches a first predefined level but does not turn the regulator back on until the die temperature falls to a second predefined level which is significantly lower than the first level. However, the built-in hysteresis typically requires a large number of components that occupy a large die area and have a corresponding high fabrication cost.

Hence, there is a need for a thermal shutdown circuit and method that incorporates hysteresis to achieve a high performance while reducing the number of components to provide a low fabrication cost.

DETAILED DESCRIPTION OF THE DRAWINGS

In the figures, elements having the same reference number have similar functionality.

Figure 1:
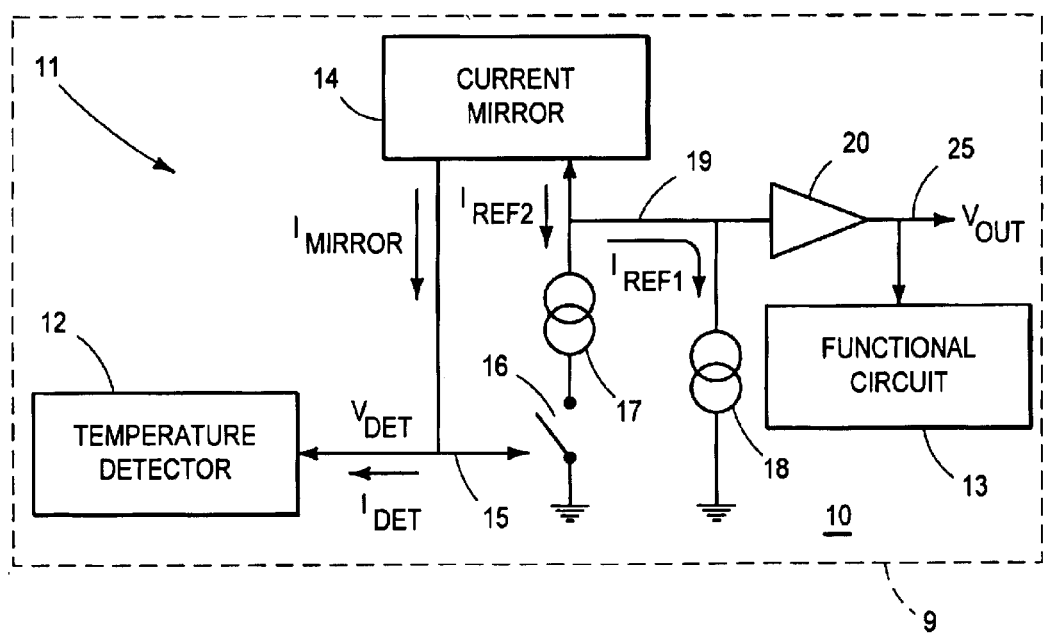
FIG. 1 is a simplified schematic diagram of an integrated circuit including a thermal shutdown circuit.

FIG. 1 is a simplified schematic diagram of an integrated circuit 10 that includes a thermal shutdown circuit 11 and a functional circuit 13 formed on a single semiconductor die represented by a dashed line 9. Alternatively, functional circuit 13 and thermal shutdown circuit 11 are formed on different semiconductor substrates which are thermally coupled to each other and housed in a single package represented by dashed line 9. Thermal shutdown circuit 11 provides a protective function while functional circuit 13 provides the primary function of integrated circuit 10. For example, in one embodiment, functional circuit 13 functions as a voltage regulator that includes a power transistor or other heat dissipating component located in a region of the semiconductor die where the die temperature is at or near its maximum. To protect functional circuit 13 from damage due to an excessive die temperature, thermal shutdown circuit 11 produces an output signal $V_{OUT}$ on a node 25 that turns off or deactivates functional circuit 13 when the die temperature rises to a maximum predefined temperature. In addition, $V_{OUT}$ has a temperature hysteresis characteristic that turns on or reactivates functional circuit 13 when the die temperature cools down to a lower predefined temperature. Alternatively, depending on the input characteristics of functional circuit 13, a detection signal $V_{DET}$ produced on node 15 may be used to control the shutdown and reactivation of functional circuit 13. Thermal shutdown circuit 11 includes a temperature detector 12, a current mirror 14, a switch 16, current sources 17–18 and an amplifier 20.

Temperature detector 12 includes at least one component that has an electrical parameter that varies with temperature. This component typically is formed on a semiconductor die adjacent to a power transistor or other heat dissipating component of functional circuit 13 to monitor or sense as accurately as possible the maximum local temperature of the semiconductor die. Detector 12 produces a detection current $I_{DET}$ on node 15 that varies as a function of this local die temperature, resulting in a detection signal $V_{DET}$ as explained below.

Current sources 17–18 generate reference currents $I_{REF2}$ and $I_{REF1}$, respectively, that represent die temperatures at which functional circuit 13 is turned on and off. Briefly, the sum $(I_{REF2}+I_{REF1})$ is representative of a predefined maximum die temperature at which thermal shutdown circuit 11 turns off or deactivates functional circuit 13, while reference current $I_{REF1}$, represents a predefined lower temperature to which the die temperature must cool before shutdown circuit 11 reactivates or turns the external circuitry back on. In one embodiment, $(I_{REF2}+I_{REF1})=100.0$ microamperes, approximately, represents a die temperature of about 167 degrees Celsius (°C.), while $I_{REF1}=14.0$ microamperes, approximately, represents a die temperature of about 142° C. Hence, reference current $I_{REF2}$ effectively represents the amount of temperature hysteresis, or about 25° C.

Switch 16 comprises a transistor which is switched off or on by detection signal $V_{DET}$.

Amplifier 20 comprises a standard voltage gain stage and/or level shifter that amplifies the signal on its input at a node 19 and produces output signal $V_{OUT}$ on node 25. The main function of amplifier 20 is to translate the voltage on node 19 to a level suitable for interfacing with functional circuit 13. Although shown as a non-inverting gain stage, amplifier 20 may alternatively be formed as an inverting gain stage or, in some applications, may not be needed at all.

Current mirror 14 comprises a standard current mirror circuit coupled to a supply voltage $V_{CC}$ and receiving reference currents $I_{REF1}$, and $I_{REF2}$ at an input coupled to node 19. Current mirror 14 produces a scaled or mirrored current $I_{MIRROR}$ at an output coupled to node 15 whose value is $I_{MIRROR}=K*I_{REF1}$ when switch 16 is open and $I_{MIRROR}=K*(I_{REF1}+I_{REF2})$ when switch 16 is closed, where K is a scale factor. Note that current sources 17 and 18 are both coupled to node 19 at the input of current mirror 14, which results in a low component count and die area that provides an efficient and low cost circuit. Hence, the input to current mirror 24, i.e., at node 19, functions as a current summing node. In one embodiment, K=1.0.

In operation, assume that integrated circuit 10 is operating at a low temperature (e.g., room temperature or about 25° C.) so that functional circuit 13 is activated or enabled. Detection current $I_{DET}$ sinks some or all of mirror current $I_{MIRROR}$, depending on the die temperature. Hence, node 15 functions as a comparison node in that detection signal $V_{DET}$ has a high logic level when $I_{DET}$ sinks only a portion of $I_{MIRROR}$, i.e., when $I_{MIRROR}$ is greater than $I_{DET}$. $V_{DET}$ has a low logic level when $I_{DET}$ sinks all of $I_{MIRROR}$, i.e., $I_{MIRROR}$ is less than $I_{DET}$. At room temperature, $I_{MIRROR}$ is greater than $I_{DET}$, so $V_{DET}$ is high, switch 16 is closed and $I_{MIRROR}=I_{REF1}+I_{REF2}=100.0$ microamperes. Node 19 is low due to the voltage drop resulting from summing reference currents $I_{REF1}$ and $I_{REF2}$ at the input of current mirror 14 (node 19). Output signal $V_{OUT}$ is low as well, indicating that the die temperature is at a safe level and functional circuit 13 is active.

As the die temperature increases, detection current $I_{DET}$ increases until, at about 167° C., $I_{DET}>I_{MIRROR}$. At that point, detection signal $V_{DET}$ makes a high to low transition that opens switch 16. Hence, $I_{REF2}$ goes to zero and $I_{MIRROR}=I_{REF1}=14.0$ microamperes. Since $I_{DET}=100.0$ microamperes is now much greater than $I_{MIRROR}=14.0$ microamperes, $V_{DET}$ remains low and switch 16 remains off until integrated circuit 10 cools down to a die temperature of about 142° C., at which point $I_{DET}$ decreases to a level less than $I_{MIRROR}=14.0$ microamperes and switch 16 turns back on.

Figure 2:
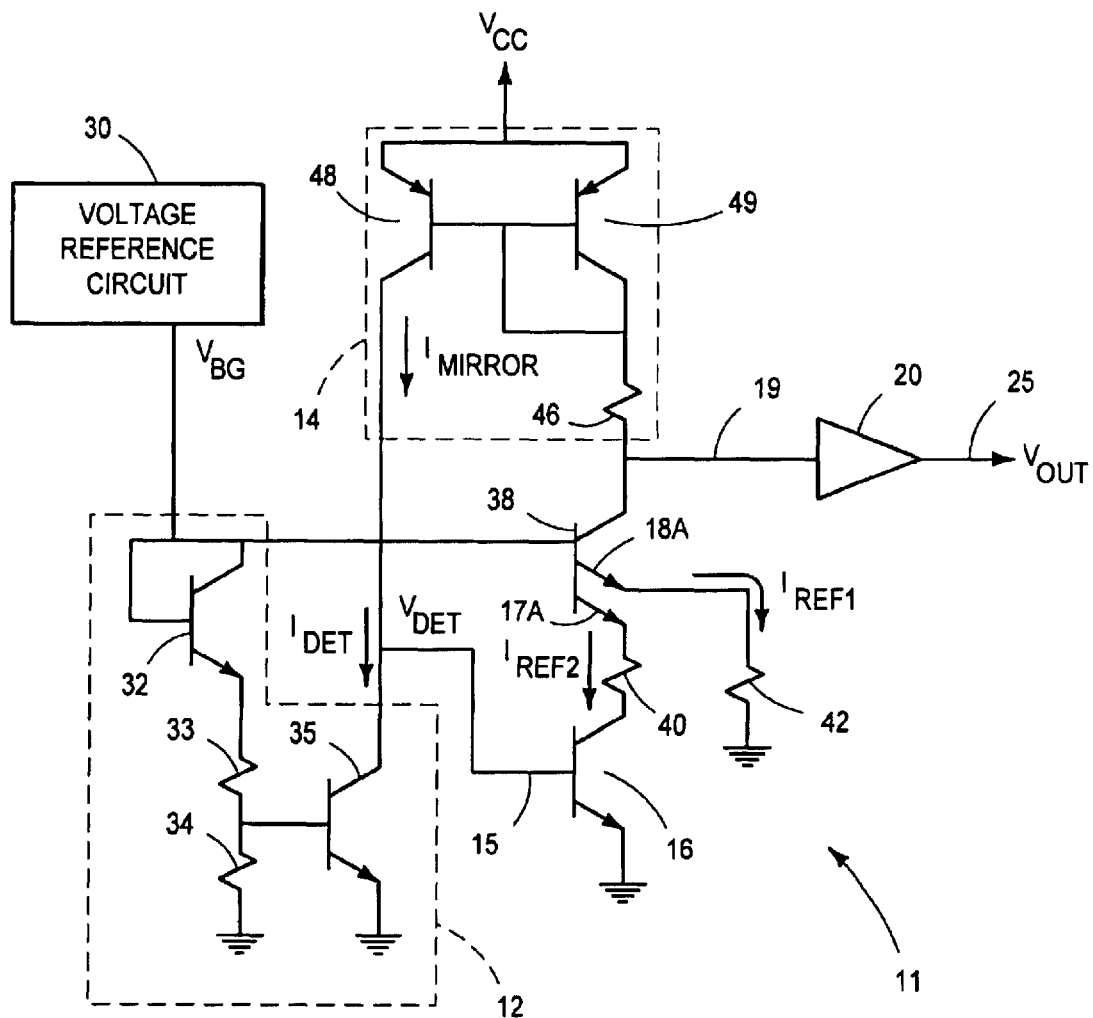
FIG. 2 is a schematic diagram showing the thermal shutdown circuit in further detail.

FIG. 2 is a schematic diagram of a portion of integrated circuit 10 showing thermal shutdown circuit 11 in further detail along with amplifier 20 and a voltage reference circuit 30. In one embodiment, voltage reference circuit 30 comprises a bandgap regulator generating a bias voltage $V_{BG}=14.2$ volts on a node 50, where $V_{BG}$ is substantially constant over temperature. In many applications, bias voltage $V_{BG}$ or another reference voltage is already generated within functional circuit 13, and therefore is available to be used by thermal shutdown circuit 11.

Temperature detector 12 includes a transistor configured as a diode 32, resistors 33–34 and a transistor 35. Resistors 33–34 function as a voltage divider producing a divided voltage at the base electrode of transistor 35. In one embodiment, the resistances of resistors 33–34 are each about ten kilohms with a positive temperature coefficient of about one thousand six hundred parts per million per degree Celsius.

Current mirror 14 includes matched or scaled PNP transistors 48 and 49 and a resistor 46. Transistor 49 is diode-coupled to function as the input device of current mirror 14 that receives reference currents $I_{REF1}$ and $I_{REF2}$ through resistor 46. Transistor 48 supplies mirrored current $I_{MIRROR}$ at the output of current mirror 14 at node 15. In one embodiment, transistors 48–49 are formed in a single epitaxial region of integrated circuit 10 as a split collector lateral PNP, to occupy a small die area. Alternatively, depending on the manufacturing process being used, current mirror 14 may be implemented with vertical PNP transistors, p-channel enhancement mode MOSFETS and the like. Resistor 46 is used to develop an increased voltage swing on node 19 to simplify the design of amplifier 20 by increasing the amplitude of $V_{OUT}$ to more easily control functional circuit 13.

Transistor 38 is a dual emitter NPN transistor that effectively functions as a transistor 17A and a transistor 18A, corresponding to its two emitters. Transistor 17A cooperates with a resistor 40 to function as current source 17 and transistor 18A cooperates with a resistor 42 to function as current source 18. Transistors 17A and 18A typically are formed in a common base region and common collector region to provide the functionality of two current sources while occupying a minimal die area. The common base region of transistors 17A–18A is biased to bias voltage $V_{BG}$ to define the voltage dropped across resistors 40 and 42 at about 0.5 volts, thereby establishing predefined current levels of currents $I_{REF1}$ and $I_{REF2}$ corresponding to the desired thermal shutdown and hysteresis temperatures described above. In one embodiment, resistor 42 has a value of about forty kilohms to establish the value of $I_{REF1}$ at about fourteen microamperes, corresponding to about 25° C. of temperature hysteresis. Resistor 40 has a value of about six kilohms to establish the value of $I_{REF2}$ at about eighty-six microamperes, which is added to $I_{REF1}$ to set the temperature threshold for thermal shutdown at about 167° C.

Switch 16 comprises an NPN transistor coupled as shown.

The operation of thermal shutdown circuit 11 proceeds as follows. At room temperature (e.g., about 25° C.), transistor 35 is off. The voltage drop across diode 32 is approximately 0.7 volts, so about 0.55 volts is dropped across the series combination of resistors 33–34, which results in about 0.275 volts on the base electrode of transistor 35. The voltage across diode 32 decreases at a rate of about two millivolts per degree Celsius, so the voltage at the base of transistor 35 increases at a rate of about one millivolt per degree Celsius. Meanwhile, for a given transistor 35 collector current, the base-emitter voltage decreases at a rate of about two millivolts per degree Celsius. Hence, the difference between the divided voltage and the transistor 35 base-emitter voltage needed to sink a value of $I_{DET}$ equal to $I_{MIRROR}=100.0$ microamperes decreases at a rate of about three millivolts per degree Celsius. It can be shown that the predefined shutdown threshold temperature $T_{TH}$ of shutdown circuit 11 is given by $$T_{TH} = \frac{V_{BE(100)} - V_{BE0}}{3 \text{ mV/°C.}} + 25° \text{ C.} \quad (1)$$

$$= \frac{0.7 \text{ V} - 0.275 \text{ V}}{3 \text{ mV/°C.}} + 25° \text{ C.}$$

$$= 167° \text{ C.}$$

where $V_{BE(100)}=0.7$ volts is the room temperature base-emitter voltage needed for transistor 35 to sink 100.0 microamperes of collector current and $V_{BE0}=0.275$ volts is the initial base emitter voltage of transistor 35. Hence, for a room temperature of about 25° C, $T_{TH}$ has a value of about 167.0° C.

Once the die temperature rises to about 167.0° C., $I_{DET}>I_{MIRROR}$, so detection signal $V_{DET}$ makes a high to low transition to open switch 16, effectively reducing $I_{REF2}$ to zero. Then, $I_{MIRROR}=I_{REF1}=15.0$ microamperes. $V_{DET}$ remains low and switch 16 remains open until the die temperature cools down to about 142° C., at which point $I_{DET}$ decreases to a level less than $I_{MIRROR}$, causing $V_{DET}$ to make a low to high transition that closes switch 16 back to start a new cycle.

Figure 3:
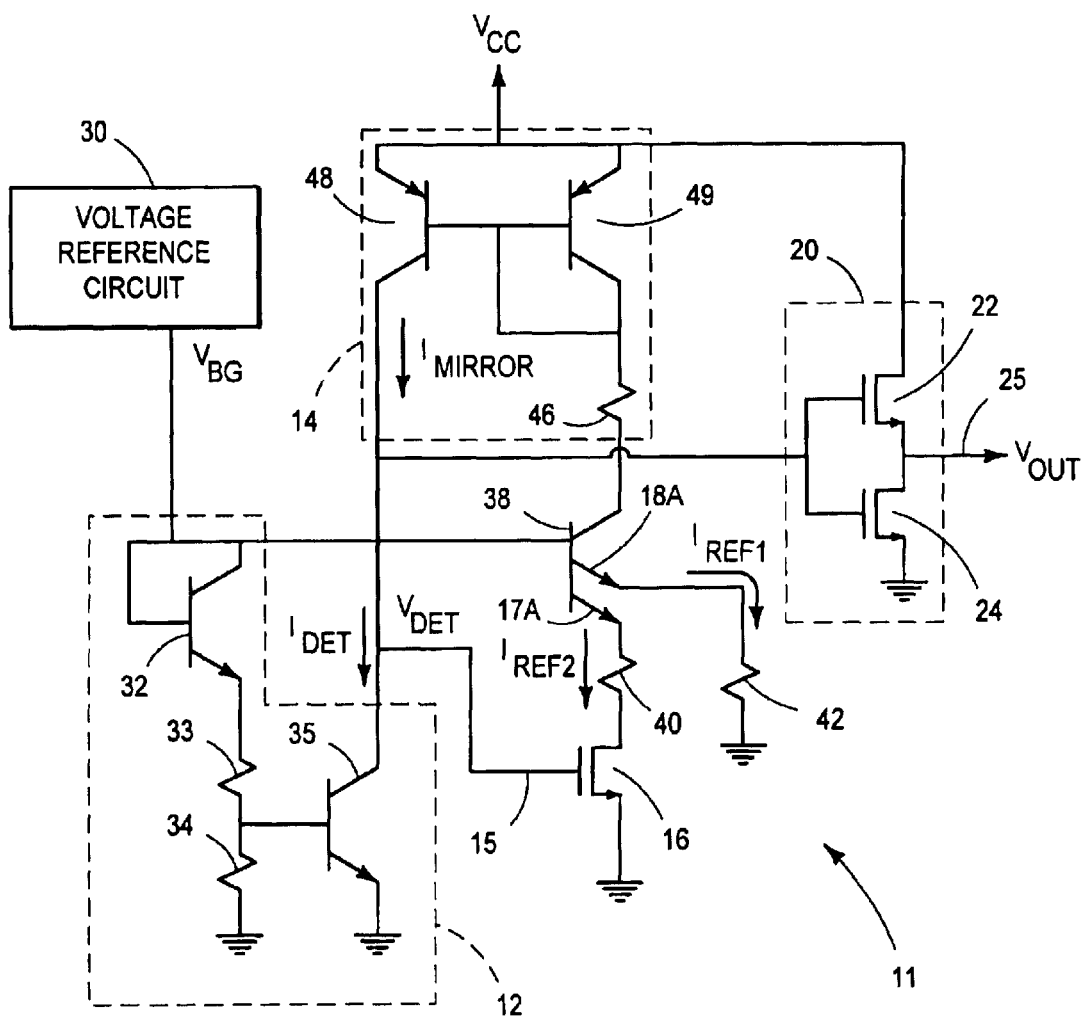
FIG. 3 is a schematic diagram of the thermal shutdown circuit in an alternate embodiment.

FIG. 3 shows a schematic diagram of thermal shutdown circuit 11, amplifier 20 and voltage reference circuit 30 in an alternate embodiment. The components are similar to those described in FIG. 2, except that switch 16 comprises an n-channel MOSFET and amplifier 20 is formed with a p-channel MOSFET 22 and an n-channel MOSFET 24 as shown. Hence, amplifier 20 is an inverting amplifier.

The use of an n-channel MOSFET for switch 16 allows node 15 to swing nearly rail-to-rail, i.e., from supply voltage $V_{CC}$ to ground, so that transistor 48 is saturated when $I_{MIRROR}>I_{DET}$. The increased voltage excursion of node 15 allows $V_{DET}$ to be used to shutdown functional circuit 13 and reduces or eliminates the need for resistor 46 to further decrease the component count.

In summary, the present invention provides a high reliability integrated circuit that incorporates a thermal shutdown protection circuit with built in hysteresis. First and second current sources respectively produce first and second reference currents which represent first and second threshold die temperatures. The first and second reference currents are summed at an input of a current mirror whose output supplies a mirror current. A detection circuit is coupled to the output of the current mirror to generate a detection signal as a function of the first and second die temperatures. The integrated circuit provides the thermal shutdown function with a small number of components and minimal die area, thereby providing a high degree of reliability at a low fabrication cost.

What is claimed is:

1. An integrated circuit, comprising:
    first and second current sources respectively producing first: and second reference currents representative of first and second die temperatures of the integrated circuit wherein the first and second current sources are enable-able;
    a current mirror having an input for summing the first and second reference currents, and an output for providing a mirror currant; and
    a detection circuit having an output coupled to the output of the current mirror for sinking the mirror current to produce a detection signal that enables the second current source as a function of the first and second die temperatures.

2. The integrated circuit of claim 1, further comprising a semiconductor die for forming the first and second current sources, the current mirror and the detection circuit.

3. The integrated circuit of claim 2, wherein the semiconductor die includes a functional circuit that is deactivated when the semiconductor die rises to the first die temperature and reactivated when the semiconductor die cools down to the second die temperature.

4. The integrated circuit of claim 1, further comprising a first resistor coupled to the input of the current mirror to develop an output signal at an output of the integrated circuit.

5. The integrated circuit of claim 4, wherein the first current source includes:
    a first transistor biased to a reference voltage and coupled to the input of the current mirror to supply the first reference current through the first resistor; and
    a second resistor coupled to a conduction electrode of the first transistor to establish a value of the first reference current.

6. The integrated circuit of claim 5, wherein the second current source includes:
    a second transistor biased to the reference voltage and having a first conduction electrode coupled to the input of the current mirror to provide the second reference current through the first resistor; and
    a third resistor coupled to a second conduction electrode of the second transistor to establish a value of the second reference current.

7. The integrated circuit of claim 1, wherein the detection circuit includes:
    a diode having a first electrode coupled to a reference voltage;
    a voltage divider coupled to a second electrode of the diode for producing a divided voltage; and
    a transistor having a control electrode for receiving the divided voltage and a conduction electrode coupled to the output of the current mirror to produce the detection signal.

8. The integrated circuit of claim 1, further comprising a switch having a control electrode coupled for receiving the detection signal, and a conduction electrode coupled to the second current source for enabling the second reference current.

9. The integrated circuit of claim 8, wherein the switch comprises an NPN bipolar transistor.

10. The integrated circuit of claim 8, wherein the switch comprises an n-channel MOSFET.

11. A method of controlling a temperature of an integrated circuit, comprising the steps of:
    sensing a temperature of the integrated circuit to generate a detection current;
    summing first and second reference currents at an input of a current mirror to provide a mirror current at an output of the current mirror;
    comparing the detection current to the mirror current to produce a detection signal when the detection current is equal to the mirror current; and
    switching the second reference current off with the detection signal when the temperature rises to a first predefined level.

12. The method of claim 11, further comprising the step of routing the reference currents through a first resistor to develop an output signal of the integrated circuit.

13. The method of claim 11, further comprising the step of switching the second reference current on when the temperature decreases from the first predefined value to a second predefined value.

14. The method of claim 13, wherein the step of switching the second reference current on includes the steps of:
    turning on a first transistor with the detection signal; and
    routing the second reference current from the first transistor through a second transistor biased to a reference voltage.

15. An integrated thermal shutdown circuit, comprising:
    a temperature detector providing a detection current as a function of a temperature of the integrated thermal shutdown circuit and having an output for producing a detection signal when the detection current is greater than a mirror current;
    a current mirror having an input for receiving a first reference current indicative of a first die temperature, and an output coupled to the output of the detector for providing the mirror current; and
    a switch operating in response to the detection signal for supplying a second reference current indicative of a second die temperature to the input of the current mirror.

16. The integrated thermal shutdown circuit of claim 15, further comprising:
    a first current source coupled between the switch and the input of the current mirror for supplying the second reference current; and
    a second current source coupled to the input of the current mirror for providing the first reference current.

17. The integrated thermal shutdown circuit of claim 15, further comprising a resistor coupled to the input of the current mirror for developing an output signal with the first and second reference currents.

18. The integrated shutdown circuit of claim 15, wherein the switch disables the second reference current as a temperature of the integrated thermal shutdown circuit increases to the second die temperature and enables the second threshold current as the integrated thermal shutdown circuit decreases to the first die temperature.

* * * * *